United States Patent [19]
Hyder

[11] 3,938,099
[45] Feb. 10, 1976

[54] ELECTRONIC DIGITAL SYSTEM AND METHOD FOR REPRODUCING LANGUAGES USING THE ARABIC-FARSI SCRIPT

[75] Inventor: Syed Salahuddin Hyder, Paris, France

[73] Assignee: Alephtran Systems Ltd., Montreal, Canada

[22] Filed: Mar. 15, 1974

[21] Appl. No.: 451,481

Related U.S. Application Data

[63] Continuation-in-part of Ser. No. 303,277, Nov. 2, 1972, abandoned.

[52] U.S. Cl. ............................... 340/172.5; 197/1 A
[51] Int. Cl.$^2$ ....................... G06K 15/02; B41J 5/00
[58] Field of Search ........ 340/172.5, 324; 101/93 C; 197/1 A; 354/5–19

[56] References Cited

UNITED STATES PATENTS

| | | | |
|---|---|---|---|
| 2,728,816 | 12/1955 | Kao | 197/1 A |
| 3,199,446 | 8/1965 | Schaaf | 101/93 C |
| 3,319,516 | 5/1967 | Brown | 197/1 A |
| 3,335,416 | 8/1967 | Hughes | 340/324 |
| 3,422,419 | 1/1969 | Mathews et al. | 340/324 A |
| 3,449,721 | 6/1969 | Dertonzos et al. | 340/172.5 |
| 3,513,968 | 5/1970 | Hanson | 340/172.5 X |
| 3,665,450 | 5/1972 | Leban | 340/324 A |
| 3,726,193 | 4/1973 | Ishii | 95/4.5 |
| T915,006 | 10/1973 | Friedman | 444/1 |

FOREIGN PATENTS OR APPLICATIONS

| | | | |
|---|---|---|---|
| 1,176,523 | 1/1970 | United Kingdom | 197/1 A |

*Primary Examiner*—Gareth D. Shaw
*Assistant Examiner*—Paul R. Woods
*Attorney, Agent, or Firm*—David A. Blumenthal; Melvin Sher; Robert E. Mitchell

[57] ABSTRACT

A system for mechanically reproducing language characters in a cursive form in accordance with the natural style calligraphy of the language. Written letters are characterized by "links" with preceding and following characters, and mathematical rules describe the cursive script in terms of the form each letter takes dependent upon the preceding and following characters. The system includes input means for inserting characters, one at a time, and for providing coded representations of the characters. The coded representations are fed to decoder means which has as an output a selected combination of concatenation properties applicable to the character. Analyzer means analyzes variables dependent on the concatentation properties of a successive string of characters which comprise a character under consideration, a preceding character and a following character. The analyzer means then provides a further coded representation of a particular concatenation property applicable to the character under consideration when the character under consideration is preceded by the preceding character and followed by the following character. The coded representation and the further coded representation are combined in a combining means to provide a composite coded representation containing information relative to a character and to its applicable concatenation properties. Means are provided for converting the composite code to a code suitable for driving output means.

6 Claims, 3 Drawing Figures

ELECTRONIC DIGITAL SYSTEM AND METHOD FOR REPRODUCING LANGUAGES USING THE ARABIC-FARSI SCRIPT

CROSS-REFERENCE TO RELATED APPLICATION

This application is a continuation-in-part of United States application Ser. No. 303,277, filed Nov. 2, 1972, now abandoned.

BACKGROUND OF THE INVENTION

1. Field of the Invention

This invention relates to a method and an apparatus for the printing of languages which use the Arabic-Farsi script.

2. Description of the Prior Art

In languages which use the Arabic-Farsi script, the alphabetic characters have a phonetic similarity with the English alphabet, but each character assumes different shapes depending on its location in a word and on the character or symbol that precedes and follows it.

The multiplicity of shapes helps in information compression, as characters need not be written in their complete and isolated form. This advantage in the handwritten form, however, has led to problems in printing and reading this family of languages.

The complexity of transfer from the handwritten word to print may be considered and solved at five levels of decreasing difficulty and cultural acceptance:

I. Handwritten reproduction, using the precision and elegance of calligraphy, with the diacritics to indicate phonetic emphasis clearly indicated. This method has been used historically for the printing of literature and holy scriptures.

II. A simplified version of calligraphy used for everyday writing. This script is usually written without diacritics and may be slightly different in appearance among Urdu, Farsi and Arabic.

III. A simplified subset of the script adapted for manual or electric typewriters. These, depending on their design, are likely to have four shapes and keys for each character, i.e. initial, final, medial and isolated; in some cases only two, initial (also used as medial) and final (also used as isolated). The user supplies the linking information, shifting the carriage on the typewriter keyboard in the middle of the word if necessary, depending on the position of the character in the word. The typing process, because of this added requirement to remember the context, is relatively slow.

IV. The next level of simplification is to have only one form per character. This printed form is quite different from the handwritten script. In communication systems that use Teletype or similar output devices, this involves minimum technical modification. By using a modified printing head, and reversing the direction of printing, an English Teletype can be used to print Arabic-like languages. Since the output has little resemblance to the written form, user acceptance would require a radical break with deepseated cultural tradition.

V. Yet another level of simplification is the replacement of the Arabic script characters by a phonetically equivalent English alphabet. The language is altered to be written in Roman form, and is phonetically and semantically the same as before. Visually it is radically different. This involves no technical modification to the printing device. It is apparent that at present functional efficiency in printing and aesthetic quality are at opposite ends of the scale. Furthermore, the choice of a particular method of printing is determined by such diverse factors as effect on employment, cultural tradition, requirement for high speed output, cost, appearance, equipment reliability and availability, and resistance to change.

At present the language is transcribed to the printed form either by hand (level I) or by mechanical means (level III), both of which are very slow methods compared to the printing speed of western languages.

For telecommunications, solutions at level IV using isolated characters have been implemented on telextype equipment on an experimental basis. As stated earlier this is an unsuitable solution, since the machine output has little resemblance to the written form.

It has been stated earlier that in the languages using Arabic-Farsi script the shape of a character is dependent upon its location and contextual position in a word. Consequently printing devices must have multiple keys and shapes for a single character of the alphabet. A user must, on the basis of his knowledge of the script, make the right choice of character shape. This makes the process of transcribing the language slow and tedious, while, at the same time, the devices used are themselves cumbersome and inefficient.

SUMMARY OF THE INVENTION

A feature of the present invention is to incorporate in a logic circuit the tradition and rules of writing and the related memory requirement of the user whereby to reproduce the natural style of a language using the Arabic-Farsi script.

According to a broad aspect, the present invention provides a system comprising means for reproducing characters of languages that use the Arabic-Farsi script at a speed commensurate with the English language while preserving the natural style calligraphy of said languages.

According to a further broad aspect, the present invention provides a method of reproducing languages using the Arabic-Faris script comprising reproducing characters of said languages at a speed comparable to the English language while preserving the natural calligraphic style of said language.

The present invention is an advance in the art and technique of printing the family of languages using the Arabic-Farsi script to a level comparable to the efficiency of printing the English language. Potential applications of the invention are for use with teletypes for business, hospitals, airlines, industry, and education. Also, the invention will provide for simplified typewriters, working at the same speed as those for the western alphabet. Further, the invention can be used for automatic and photocomposition in the printing industry, graphical display devices, and writing on illuminated bulbs used in cities for news and advertising. The latter is a very common method of communication in big cities in that part of the world using languages with Arabic-Farsi script.

The present invention also preserves the natural beauty of calligraphy e.g. Naskh and Riquaa scripts in the case of the Arabic language, without compromising it with technical limitations. The introduction of new technology which helps to preserve culture and tradition will evoke a very positive emotional response in the users, and with time new applications will develop in the countries where the languages using Arabic-Farsi script are spoken.

BRIEF DESCRIPTION OF THE DRAWINGS

The invention will be better understood by an examination of the following description together with the accompanying drawings in which.

DESCRIPTION OF PREFERRED EMBODIMENTS

Figure 1:
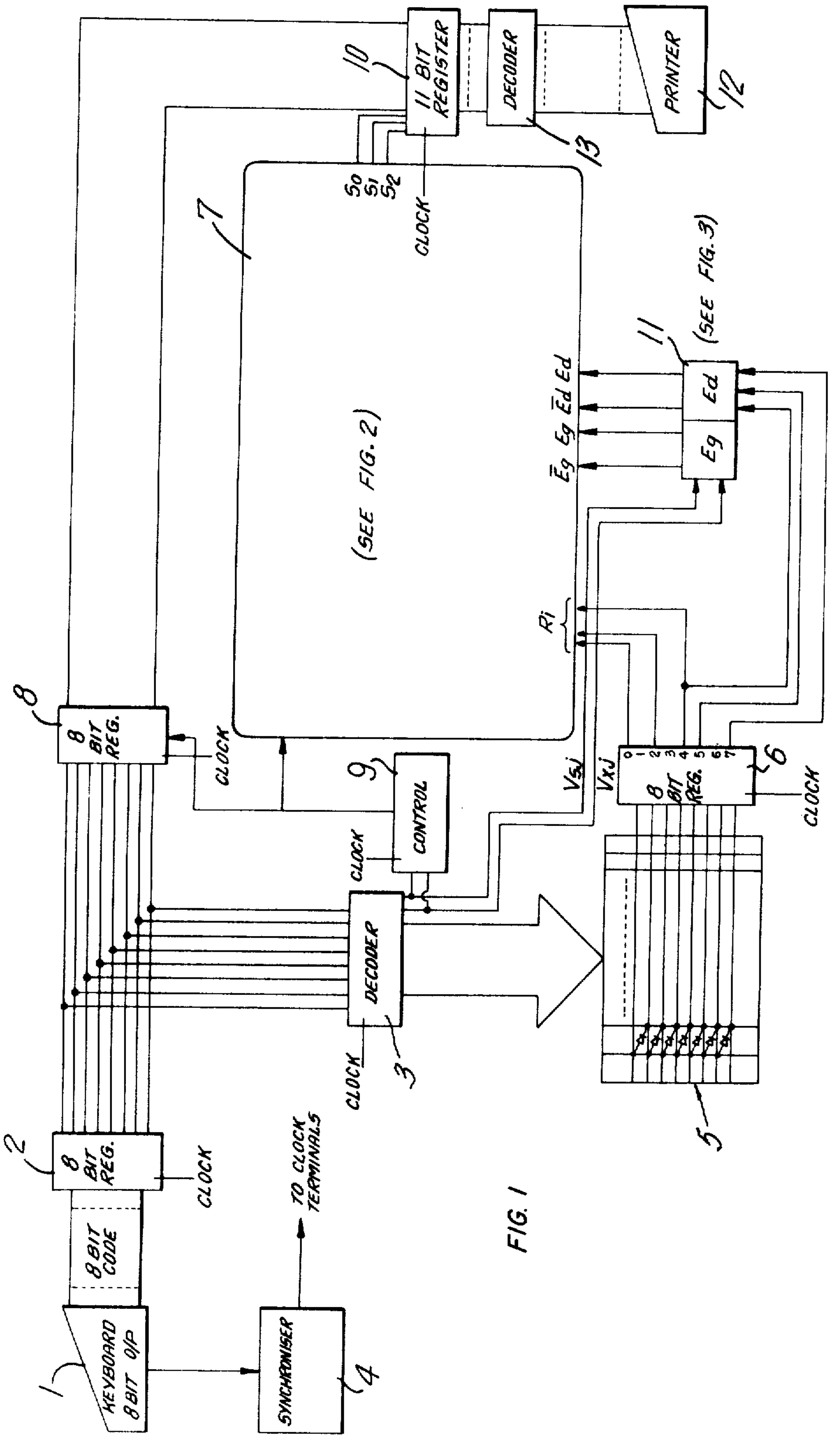
FIG. 1 is a block diagram of a system for implementing the invention.

The word "Urdu" will be used in the following description to denote the family of languages using the script of the Arabic-Farsi languages. A new theory has been developed to form the basis of the hardware design of the present invention. This is a first step in building the logical system, which is a particular embodiment of the principles delineated below.

Let $V_E = [A, B, ..., Z]$ be the set of characters of the English alphabet and let $V_E'$ be the set of characters of the Urdu alphabet whose elements have a phonetic similarity with the corresponding characters in English. However, Urdu, depending on country and usage, may have up to 35 characters. Let $V_U$ be the complete set of characters of the Urdu alphabet, then $V_U = V_E'$ U [additional characters of Urdu without correspondence in English].

Next, define $V_X$ to be the set of symbols that need not be analyzed in the formation of a word, since they are printed without modification. This set includes numerals, punctuation marks, and, most important, diacritics that are used in Urdu to denote phonetic information.

The total alphabet, $V_A$, that needs to be considered is then:

$$V_A = V_U \cup V_X$$

For the purpose of the analysis, the set $V_A$ is partitioned into four groups. This partitioning is based on the applicant's interpretation of the script. It may be modified depending upon the country, language and individual preferences of the user. The importance of this partitioning will be explained later.

Let the Urdu character corresponding to the English character $C_i$ be called $\omega_{Ci}$, where $C_i \in V_E$. Next, define $\omega_{ij}$ as the Urdu character script shape of the type j corresponding to the English character $C_i$ for i = 1, ..., 26; $j \in I_i$, where for each i, $I_i$ is the set of $j_s'$ for which the script shape $\omega_{ij}$ exists. For the sake of simplicity one may write $\omega_{sj}$ to denote $\omega_{ij}$ for $s = C_i$, e.g. $\omega_{A5} = \omega_{1,5}$.

| | |
|---|---|
| $A_{ij} = 1$ | $\omega_{i,j}$ exists |
| $= 0$ | $\omega_{i,j}$ does not exist. |

The availability matrix is implemented in a Read Only Memory, and plays an important role in the hardware design as will be described later with reference to a script processor design.

It should be noted that Urdu is written from right to left. Consider the concatenation properties of an Urdu character $\omega_i$. Let A, B and C be three Boolean variables which describe the following concatenation properties.

i.

A = O symbol concatenates on both sides.

A = 1 symbol does not concatenate on at least one side. It is isolated or initial or terminal.

ii.

B = O links down to the left

B = 1 links up to the left iii.

C = O links down from the right 1 links up from the right

The properties are summarized in Table I which follows. 8

Table 1

| A B C Min-term | | Link Table Comment |
|---|---|---|
| 0 0 0 $P_0$ | | Links down L<br>Links down R<br>Concatenates in both directions. |
| 0 0 1 $P_1$ | | Links down L<br>Links up R<br>Concatenates in both directions. |
| 0 1 0 $P_2$ | | Links up L<br>Links down R<br>Concatenates in both direction. |
| 0 1 1 $P_3$ | | Links up L<br>Links up R<br>Concatenates in both directions |
| 1 0 0 $P_4$ | | Links down R.<br>Terminates on L. |
| 1 0 1 $P_5$ | | Links up R<br>Terminates on L. |
| 1 1 0 $P_6$ | | Links up or down at L.<br>Initial. No links on R. |
| 1 1 1 $P_7$ | | Does not links on L or R<br>Isolated symbol. |

We assign to $j$ in $\omega_{ij}$ the suffix of the corresponding Min-term

The English characters A, B, D, J, for example will have the following associated graphic shapes and names in the Urdu writing system.

Table 2

| Letter | | Shapes of symbols A, B, D & J P-term / $\omega_{ij}$ / graphic shape | | | | | | | |
|---|---|---|---|---|---|---|---|---|---|
| English | Urdu | $P_0$ | $P_1$ | $P_2$ | $P_3$ | $P_4$ | $P_5$ | $P_6$ | $P_7$ |
| A | $\omega_A$ | — | — | — | | — | $\omega_{A5}$ | $\omega_{A6}$ | $\omega_{A7}$ |
| B | $\omega_B$ | — | $\omega_{B1}$ | — | $\omega_{B3}$ | — | $\omega_{B5}$ | $\omega_{B6}$ | $\omega_{B7}$ |
| D | $\omega_D$ | — | — | — | — | — | $\omega_{D5}$ | $\omega_{D6}$ | $\omega_{D7}$ |
| J | $\omega_J$ | — | — | $\omega_{J2}$ | — | $\omega_{J4}$ | — | $\omega_{J6}$ | $\omega_{J7}$ |

The availability of shapes may be represented by the Boolean Matrix $A_{i,j}$ which signifies that for a given character $C_i$, and for j = 0, 1, ..., 7 if for j = j', 0 < j' < 7, then if The domains for graphic shapes $\omega_{Ci}$ in Urdu for the English character $C_i$ are:

$\omega_A = \{\omega_{A5}, \omega_{A6}, \omega\}$ $\omega_B = \{\omega_{B1}, \omega_{B3}, \omega_{B5}, \omega_{B6}, \omega_{B7}\}$ $\omega_D = \{\omega_{D5}, \omega_{D6}, \omega_{D7}\}$ $\omega_J = \{\omega_{J2}, \omega_{J4}, \omega_{J6}, \omega_{J7}\}$ The first two rows of the availability matrix $A_{ij}$ would then be $$A_{ij} = \begin{vmatrix} 0\ 0\ 0\ 0\ 0\ 1\ 1\ 1 \\ 0\ 1\ 0\ 1\ 0\ 1\ 1\ 1 \end{vmatrix}$$

As mentioned earlier, the set of the total alphabet $V_A$ is partitioned into four groups such that the characters having the same architectural characteristics in their Urdu form and similar concatenation properties constitute the same class of the partition.

$$V_A = \{V_S, V_U, V_D, V_X\}$$

For the purpose of illustration, let $V_E = \{V_S', V_U', V_D'\}$ where $V_S' \subseteq V_S$, $V_U' \subseteq V_U$ and $V_D' \subseteq V_D$.

<u>$V_S'$</u>

The characters in this partition $V_S' = \{\omega_A, \omega_R, \omega_D, \omega_O\}$ have the property that they do not concatenate with the successor.

<u>$V_D'$</u>

The right link (connecting with the precedecessor) of the characters points downwards. For example characters of the type $\omega_{i0}$, $\omega_{i2}$ and $\omega_{i4}$ would be included in this partition.

<u>$V_U'$</u>

The right link of the characters points upwards. Urdu graphics or the type $\omega_{i1}$, $\omega_{i3}$, and $\omega_{i5}$ would be included in this partition.

<u>$V_X$</u>

This partition which includes numerals etc... has been described earlier.

It is assumed that the four partitions do not contain any common elements.

In the current design $V_S' = \{\omega_A, \omega_R, \omega_D, \omega_o\}$ $V_D' = \{\omega_H, \omega_J, \omega_M\}$ $V_U' = \{V_E' - V_U' - V_s'\}$ As stated earlier the choice of characters in a partition is based on the applicant's understanding of the script. It could vary depending on the language, the country and the user.

The following description relates to the details of a transformational grammar, which accepts characters in their input sequence and performs a forward scan for the analysis. For the sake of completeness some basic definitions are reviewed.

A grammar $G=(V_T, V_N, P, \sigma)$ is a 4-tuple that consists of

- $V_T$ a terminal vocabulary
- $V_N$ a non-terminal vocabulary
- P a set of production rules
- $\sigma$ a sentence symbol which is member of $V_N$.

If each production is of the form $$\phi\ \xi\ \psi \rightarrow \phi\ \omega\ \psi$$

where $\phi$ and $\psi$ are in $(V_T \cup V_N)^*$ and $\omega$ is in $(V_T \cup V_N) - \{\epsilon\}$, where $\{\epsilon\}$ is the empty word, then the grammer G is called context sensitive. It should be noted that $\phi$ and $\psi$ may be null, and $\omega$ may not be empty. Specifically $V_N = V_A \cup \theta$, and $V_T = \{\omega_{ij} \mid i \in \{1,...,35\}, a_{ij} \neq 0\} \cup \{\#\} \cup \{V_X\}\}$ is the set of terminal Urdu character graphics augments by the delimiter #, and the set $V_x$. It is recalled that the symbols in $V_x$ are printed without modification.

The grammar described below transforms words written in Urdu characters, i.e. strings over $V_0^*$, into words written in well-formed Urdu script graphics, i.e.

strings over $V_T^*$. It is assumed that a sufficient number of production rules of the form $\sigma \rightarrow \#\ \alpha\ \#$ exists, where $\alpha$ is a word writen with Urdu characters ($\alpha \in V_0^*$). These rules generate the language, e.g. Arabic or Farsi, and are different for each language. They are of no concern to the theory of the invention. The rules which transform the word of a language to its written form are context sensitive, and are given below as:

R0: This is a large set of production rules of the form $\sigma \rightarrow \#\, S_1, \ldots S_n\, \#$, where $S_1, \ldots, S_n \in V_0$ and $S_1, \ldots S_n$ is the pseudo-English representation of an Urdu word.

R1: $S_i\ S_j \rightarrow \omega_{i7}\ S_j$ for $S_i, S_j \in V_x \cup \#$

R2: $S_i\ C_j \rightarrow \omega_{i7}\ C_j$ for $S_i \in \{V_x \cup \#\}$ and $C_j \in V_0$ R3: $\omega_{kl}\ C_i\ C_j \rightarrow \omega_{kl}\ \omega_{i7}\ C_j$ for $C_i \in V_S$ and $l \in \{4, 5, 7\}$ R4: $\omega_{kl}\ C_i\ C_j \rightarrow \omega_{kl}\ \omega_{i6}\ C_j$ for $C_j \in V_D \cup V_U \cup V_x$ and $l \in \{4, 5, 7\}$ R5: $\omega_{kl}\ C_i\ C_j \rightarrow \omega_{kl}\ \omega_{i5}\ C_j$ for $C_j \in V_S$ and $l \in \{0, 2, 6\}$ R6: $\omega_{kl}\ C_i\ C_j \rightarrow \omega_{kl}\omega_{i4}\ C_j$ for $C_j \in V_S$ and $l \in \{1, 3, 6\}$ R7: $\omega_{kl}\ C_i\ C_j \rightarrow \omega_{kl}\ \omega_{i3}\ C_j$ for $C_j \in V_U$ and $C_i \in V_U$ and $l \in \{2, 3, 6\}$ R8: $\omega_{kl}\ C_i\ C_j \rightarrow \omega_{kl}\ \omega_{i2}\ C_j$ for $C_j \in V_U$ $C_i \in V_D$ and $l \in \{0, 1, 6\}$ R9: $\omega_{kl}\ C_i\ C_j \rightarrow \omega_{kl}\ \omega_{i0}\ C_j$ for $C_j \in V_D$, $C_i \in V_D$ and $l \in \{0, 1, 6\}$ R10: $\omega_{kl}\ C_i\ C_j \rightarrow \omega_{kl}\ \omega_{i1}\ C_j$ for $C_j \in V_D$, $C_i \in V_U$ and $l \in \{2, 3, 6\}$ R11: $\omega_{kl}\ C_i \# \rightarrow \omega_{kl}\ \omega_{i4}\ \#$ for $C_i \in V_D$ and $l \in \{0, 1, 6\}$ R12: $\omega_{kl}\ C_i \# \rightarrow \omega_{kl}\ \omega_{i5}\ \#$ for $C_i \in V_U \cup V_S$ and $l \in \{2, 3, 6\}$ R13: $\omega_{kl}\ C_i \# \rightarrow \omega_{kl}\ \omega_{i7}\ \#$ for $l \in \{4, 5, 7\}$ These rules formally express the tradition of writing the Urdu language. This is a new idea, and forms an important and integral part of the hardware design of the present invention.

The theory and logical design of the machine which performs the syntactic transformation described previously are given below.

It is well known that a context sensitive language is accepted by a linear bounded automaton. However, in this case, while the grammar is context sensitive, the requirement is to find a transducer that would both accept and transform. It appeared reasonable to find a finite state deterministic automaton.

The production rules of the grammar of script generation may be re-stated as under:

The string (actually written from right to left in Urdu)

$$\omega_{kl}\ C_i\ C_j$$

and its concatenation characteristics are expressed in terms of four new Boolean variables $E_d$, $E_g$, $R_i$, and $R_j$. They are described below:

<u>$E_d$</u>

The character $C_k$ that had been previously transformed to $\omega_{kl}$ is replaced by $E_d$, such that $$E_d = \begin{cases} 0, \text{ if } l \in \{4, 5, 7\}, \text{ and} \\ 1 \text{ otherwise} \end{cases}$$

<u>$E_g$</u>

It describes the contatenation characteristics of the two characters $C_i$ (undergoing analysis) and $C_j$ (last input), as follows:

$$E_g = \begin{cases} 0 \text{ if } C_i \in V_S \cup V_x \text{ or } C_j \in V_x, \text{ and} \\ 1 \text{ otherwise} \end{cases}$$

$R_i$ and $R_j$

These Boolean variables, $R_i$ and $R_j$, describe the right link properties of the characters $C_i$ and $C_j$ respectively.

$$R_i, R_j = \begin{cases} 0 \text{ right link down} \\ 1 \text{ right link up} \end{cases}$$

Next, the new output Boolean variables $S_0$, $S_1$, $S_2$ are defined, which help in code translation from the input variables $E_u$, $E_d$, $R_i$ and $R_j$.

The following table may be easily constructed from the production rules described earlier.

Table 3.

Code translation Table

| $R_j$ | $R_i$ | $E_u$ | $E_d$ | $S_0$ | $S_1$ | $S_2$ | Output | Rule |
|---|---|---|---|---|---|---|---|---|
| — | — | 0 | 0 | 1 | 1 | 1 | 7 | 3,13 |
| — | 0 | 0 | 1 | 1 | 0 | 0 | 4 | 11 |
| — | 1 | 0 | 1 | 1 | 0 | 1 | 5 | 12 |
| — | 0 | 0 | 1 | 1 | 0 | 0 | 4 | 6 |
| — | 1 | 0 | 1 | 1 | 0 | 1 | 5 | 5 |
| — | — | 1 | 0 | 1 | 1 | 0 | 6 | 4 |
| 0 | 0 | 1 | 1 | 0 | 0 | 0 | 0 | 9 |
| 0 | 1 | 1 | 1 | 0 | 0 | 1 | 1 | 10 |
| 1 | 0 | 1 | 1 | 0 | 1 | 0 | 2 | 8 |
| 1 | 1 | 1 | 1 | 0 | 1 | 1 | 3 | 7 |

By simplification the Boolean variables $S_0$, $S_1$, $S_2$ may be obtained in terms of the variables $E_u$, $E_d$, $R_i$, and $R_j$ as follows:

$$S_0 = \overline{E}_u + \overline{E}_d \quad (1)$$

$$S_1 = E_u \cdot E_d \cdot R_j + \overline{E}_d \quad (2)$$

and $$S_2 = \overline{E}_u \cdot \overline{E}_d + E_d \cdot R_i \quad (3)$$

The above represents a code translation scheme $\tau$: $\{0,1\}^m \rightarrow \{0,1\}^n$, $m \geq n$ where $m$, $n$ are the dimensions of the Boolean spaces (4 and 3 in this case) of the input and output respectively.

Thus, the variables $S_0$, $S_1$, $S_2$ give the representation of the form of the Urdu graphic $\omega_{im}$ corresponding to the character $C_i$ in the string $C_k$ $C_i$ $C_j$, in terms of the concatenation and linking properties of the characters in the string.

The operation will now be described. The analysis of the character string is performed in a uniform manner, no distinction being made between characters in different partitions of $V_A$, i.e. $V_U$, $V_D$, $V_S$ and $V_X$. The output follows the input with a one symbol delay. This mode of operation results in a simple design, by minimizing the problems of synchronization, timing and control. In a communication system where two Teletype like devices are linked to each other, the method proposed here eliminates the impression of erratic functioning on the user, who anticipates and receives a continuous message, not being aware of the delay. To the sender, inspite of the one symbol delay, this method with the feature of continuous output is equally attractive.

For the purpose of illustration let us recall the process of analysing the string $\omega_{kl}$ $C_i$ $C_j$. It is noted that the previous symbol $C_k$ had been analysed as the Urdu graphic $\omega_{kl}$, $C_i$ is the symbol under analysis, and $C_j$ is the last symbol received. The overall design of the script processor shown in the drawing will now be described with reference to the processing of the string $\omega_{kl}C_iC_j$.

As mentioned earlier, the theory described forms the basis of the hardware design of the present invention. A preferred form of the hardware design is shown with regard to the drawings. Referring to FIG. 1 of the drawings, 1 is a keyboard having alphanumeric characters on the keys. The keyboard provides, at its output, an eight bit code representative of the character of a key which is depressed. Such keyboards are well known in the art, and, as is well known, the eight bit binary code is a standardized code for use in such keyboards. The keyboard could comprise, for example, the keyboard of a KSR.33 Teletype system.

The output of the keyboard is fed, in parallel, to eight bit register 2. The eight bit register can comprise a series of eight flip-flops or any other similar means well known in the art. The output of the eight bit register 2 is fed, again in parallel form, to decoder 3. The decoder is of the well known type which receives a coded binary input and provides an output at only one of a plurality of outputs depending on the code at the input. A memory decoder, for example a Texas Instrument SN74154, which receives a 4 bit input and provides an output at any one of 16 outputs, can be used to fabricate the decoder 3. In one embodiment of the invention, 35 output lines are required. Thus, it would be necessary to use four SN74154's to make a decoder to be used in this embodiment. (It will, of course, be appreciated that such an arrangement will provide 256 outputs. Only 35 are used).

The output of the decoder is fed to a Read Only Memory (ROM) 5. The ROM is a well known matrix and can consist of, for example, a plurality of diodes connected across the input and output as shown in the drawings. It is of course understood that only a small number of the total number of diodes are shown in the drawings. However, the ROM does not have to constitute this particular type of matrix and any other matrix which will serve the function can serve in its place. The input to the ROM consists of a plurality of leads corresponding in number at least to the plurality of leads at the ouput of the decoder. Each lead at the output of the decoder is connected to a separate lead at the input to the ROM. The output of the ROM is eight leads which provides an eight bit code in binary form. The ROM is the physical implementation of the availability matrix discussed above. As will be appreciated, the availability matrix will be different for different scripts or for different interpretations of the same script. However, in accordance with the inventive system, any one of these scripts or different interpretations of scripts can be implemented by the mere substitution of an ROM containing the appropriate availability matrix.

The output of the ROM is fed to availability register 6 which again comprises an eight bit register.

Status register 11, which will be more fully discussed below, receives inputs from both the availability register 6 and the decoder 3 as will be more fully discussed below. The status register, in turn, provides outputs to the analyzer module 7 which is described in more detail with regard to the description concerning FIG. 2 of the drawings.

The output of the eight bit register 2 is fed, in a parallel path, to eight bit register 8. Outputs from the register 8 and from the analyzer module 7 are fed to an 11 bit register 10 which contains the 8 bit of a character from register 8, and a 3 bit code of a particular shape, i.e., one of the eight of Table 1, as received from the analyzer module 7. The 11 bit code is decoded by a decoder 13 to drive the printer 12. The decoder 13 can comprise a series of logic circuits, including AND gates, OR gates, shift registers etc., which will convert the 11 bit code to, for example, an eight bit code to drive the printer. The printer 12 is a standard printer which is driven by an eight bit binary signal and is well known in the art and could comprise for example, a printer of the Teletype system discussed above. Decoder 3 also provides an output to the input of control unit 9 whose output is fed both to the eight bit register 8 and the analyzer module 7. As will be seen, the ouput of the control unit 9 is fed to the clock terminals comprising the units 7 and 8 to advance these units without an analysis by the analyzer module.

Synchronizer 4 provides a clock signal to the clocked units of the system in synchronism with the operation of the keyboard to thereby synchronize the entire system with the keyboard.

Figure 2:
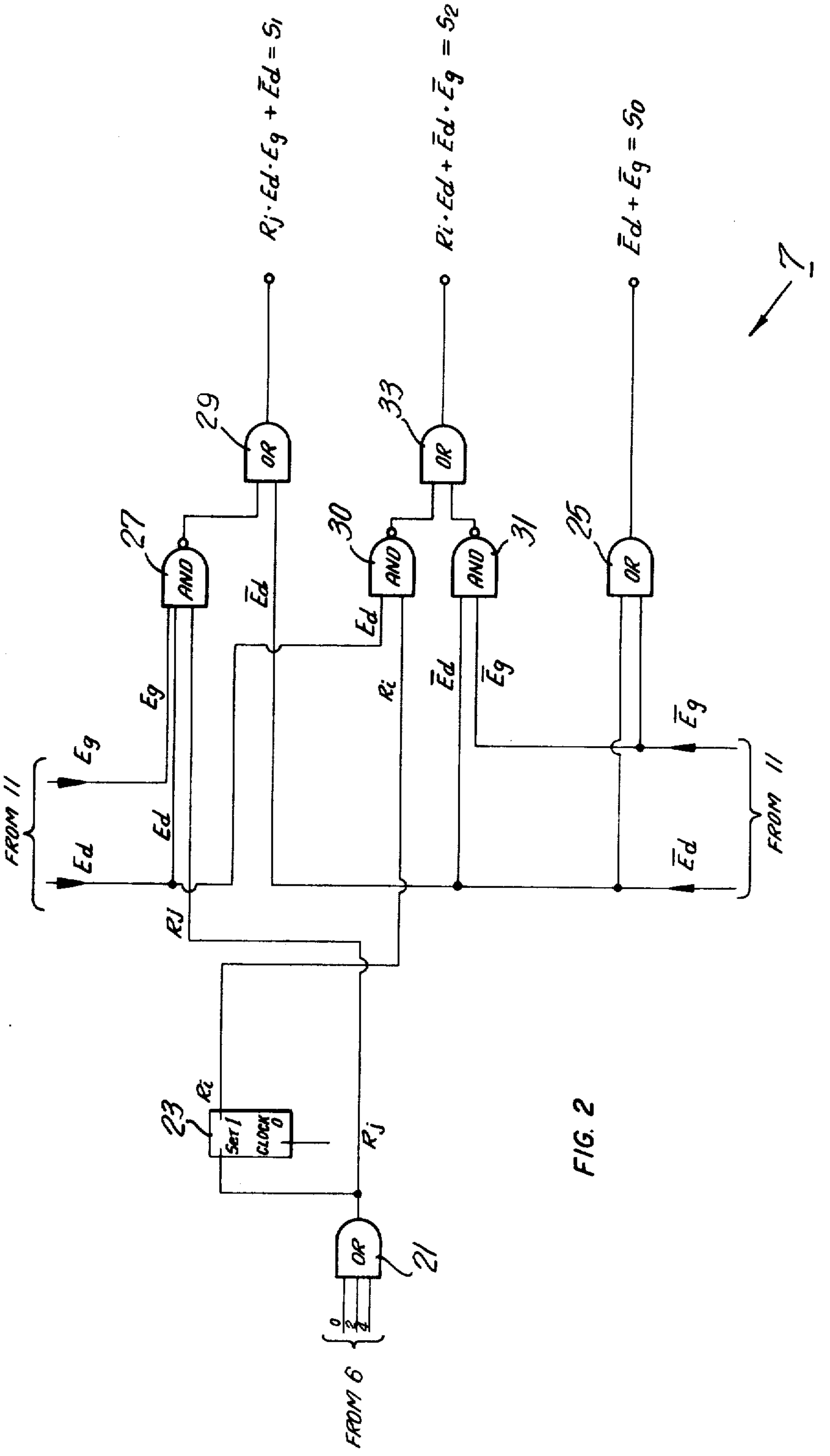
FIG. 2 shows the contents of the analyzer of FIG. 1 in greater detail.

The function of the analyzer module is to implement the Boolean equations 1, 2 and 3 disclosed above. Boolean equations are of course, most easily implemented with a series of logic elements. A form of the analyzer module is shown in FIG. 2 of the drawings. Referring to FIG. 2, output from the availability register 6 is fed to OR gate 21. The output of OR gate 21 is fed to flip-flop 23 and to AND gate 30.

Equation (1) is implemented by OR gate 25 which receives its input from the NOT terminals of state register 11. Equation (2) is implemented with the combination of AND gate 27 and OR gate 29. AND gate 27 is fed from the terminals of state register 11 as well as from the output of flip-flop 23. The input to OR gate 29 comprises the output of AND gate 27 as well as one of the NOT terminals from state register 11.

Equation (3) is implemented with the combination of AND gate 30, AND gate 31 and OR gate 33. The inputs to these gates and their interconnection is easily seen in the drawings.

The operation of the entire logic circuitry comprising the analyzer module is self-evident and requires no further description here.

Figure 3:
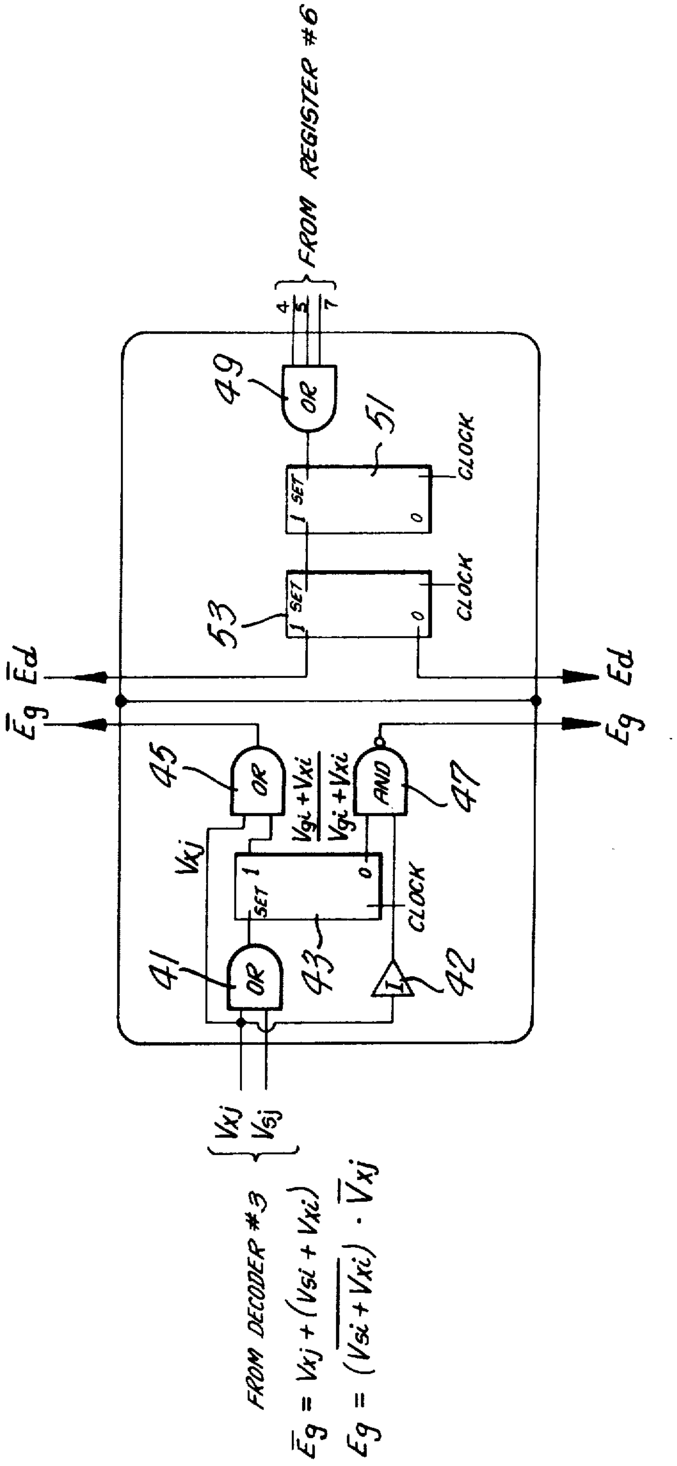
FIG. 3 shows the contents of the state register of FIG. 1 in greater detail.

Details of the state register 11 are shown in FIG. 3. As can be seen from the description of the variable $E_g$, the Boolean equation for determining $E_g$ and $\overline{E}_g$ is as shown in FIG. 3. The state register consists of the OR gate 41 which receives input $V_{xj}$ $V_{sj}$ from the decoder 3 as described with relation to FIG. 1.

According to the terminology developed above, $V_x$ is a character in the partition including numerals etc. As can be seen in FIG. 1, when decoder 3 decodes such a character, it provides an output on a selected one of its output leads.

As $C_j$ refers to the character following the character $C_i$ under consideration, $V_{xj}$ is the signal at the selected output of 3 when $C_j$ is in the partition $V_x$.

$C_j$ becomes $C_i$ when a further character (following $C_j$) is keyed in. At the onset, $V_{xj} + V_{sj}$ is stored in flip-flop 43. When the further character is keyed in, 43 is clocked and its output is $V_{xi} + V_{si}$.

In a like manner $V_{sj}$ is a selected output on decoder 3 when the input is a character of the partition $V_s$. The output of OR gate 41 is stored in flip-flop 43 to provide a time delay so that it is fed to the analzyer module when the next character is being considered. The $V_{xj}$ input is also fed, through inverter 42, to one terminal of AND gate 47. The other input to AND gate 47 is fed from the NOT terminal of flip-flop 43.

The $E_d$ value is obtained from the combination of OR gate 49 and flip-flops 51 and 53. The OR gate is fed from the availability register 6, and flip-flops 51 and 53 merely provide the required time delay for anlysis.

In operation, the system operates as follows: When a key on the keyboard 1 is depressed, the keyboard will provide an eight bit code word representative of that character. As will be appreciated, each of the characters will be represented by a different code word. The code word is stored in the register 2 until the next key is depressed.

When the next key is depressed, it will energize the synchronizer to clock the register 2 so that the code representative of the first character will be passed on to both the decoder 3 and the register 8. The character is then decoded in the decoder and the next step in the process will depend on which of the four partitions the character falls into.

Should the character in the decoder fall into the partition $V_s$ or $V_x$, then the decoder 3 will provide an output to the control unit 9 which will then clock the register 8 to move the eight bit word down to the register 10 and thence to decoder 13 where it will be decoded to an eight bit printing code for printing that character. At the same time, the control unit 9 will provide a signal to the analyzer module 7 so that the analyzer module will not perform an analysis.

When the character falls within the partitions $V_d$ or $V_u$, then the decoder will provide an output on only one of its 35 output lines. As will be appreciated, each one of the output lines is associated with a different character. The signal on the decoder output line will be applied to its appropriate input of the ROM 5 and then passed to the 8 bit register 6 and, subsequently, to both the status register 11 and the analyzer module 7.

As will be appreciated, a character inserted via the keyboard 1 will not be printed on the printer until the next character has been inserted via the keyboard 1. After the next character has been inserted, the analyzer module will perform an analysis of the character under consideration, the character preceding the character under consideration, and the character following the character under consideration, to solve the equations (1), (2) and (3) to thereby provide values for $S_0$, $S_1$ and $S_2$. These values are provided to the register 10 so that the register will receive an eleven bit word which fully describes both the appropriate shape of a character and its linking characteristics taking into consideration the preceding and succeeding characters.

The variables $S_0$, $S_1$ and $S_2$ determine the concatenation properties of the character under consideration in accordance with Table 1. Thus, if $S_0$, $S_1$, $S_2$ is 011, then the concatenation properties of the character will be that it links up to the left as links up from the right as per $P_3$ of the table.

For the purpose of testing the processor shown in the drawing, the Teletype output was modified to simulate Urdu writing with appropriate linkages. In this representation markers are printed around each character, i.e. before and after, to indicate its linkages if they exist. The method is shown below:

 link up forward (right in English, left in Urdu).

 link down forward (right in English, left in Urdu).

-continued

| | |
|---|---|
| ˙□ | link up backward |
| .□ | link down backward |
| □: | initial |
| □ | Independent surrounded by blanks |
| .□:□ | Terminal down, up backward. |

As an example, let us consider the word JOAB, which means "answer" in the Farsi language, and is printed on line 2 of Table 4. The analysis follows as under.

$$\sigma \xrightarrow[\text{R O}]{\text{Rule}} \#JOAB\#$$

$$\#JO \xrightarrow[\text{R 2}]{\text{Rule}} \omega_{i7}JO$$

$$\omega_{i7}JO \xrightarrow[\text{R 4}]{\text{Rule}} \#\omega_{J6}O$$

$$\omega_{J6}OA \xrightarrow[\text{R 5}]{\text{Rule}} \omega_{J6}\omega_{O5}A$$

$$\omega_{O5}AB \xrightarrow[\text{R 3}]{\text{Rule}} \omega_{O5}\omega_{A7}B$$

$$\omega_{A7}B\# \xrightarrow[\text{R13}]{\text{Rule}} \omega_{A7}\omega_{B7}\#$$

The string $\# w_{J6}w_{O5}w_{A7}w_{B7} \#$ is printed on the Teletype as J!˙O ⌣̇A ⌣B.

In addition to the above example, other words are printed by the processor in pseudo-Urdu showing their correct linkage and are shown in Table 4, which is the actual output produced by the system on a KSR.33 Teletype.

Table 4

| PSUEDO-URDU OUTPUT PRODUCED BY THE PROCESSOR |
|---|
| G!'O R A |
| J!'O A B |
| B!'O L |
| B!'R B!'G''E |
| A G!'A |
| J!'A N |
| A B!'A |
| G!'A N |
| B!'B''A |
| K!'O F!'B''A |
| K!'E''A R E |
| A M!'E |
| K!'E''A R |
| A D R |
| D A R |
| R D A |
| F!'D A |
| F!'A D |
| J!'O C |
| A M!'D B!'D |

I claim:

1. A system for mechanically reproducing language characters in a cursive form in accordance with the natural style calligraphy of said language, wherein a plurality of $j$ cancatenation properties is associated with said natural style calligraphy, a selected combination of said cancatenation properties being applicable to each character of said language characters, said selected combination comprising an integral number of said concatenation properties equal in number from $j$ to O where $j$ is an integer; said system comprising;

a. input means for inserting characters one at a time and for providing coded representations of characters which do concatenate and coded representations of characters which do not concatenate, b. said input means providing coded representations associated with spaces between groups of characters, c. decoder means for receiving said coded representations of said characters for providing output signals associated with said coded representation, d. said decoder means providing a first group of output signals associated with said coded representation of characters which do not concatenate, and a second group of output signals associated with said coded representation of characters which do concatenate, e. means responsive to said output signals from said decoder means for storing coded representations of a successive string of characters comprising a character under consideration, a preceding character and a following character, f. means for analyzing said stored coded representations of said successive string of characters according to the concatenation properties of said character under consideration, said preceding character and said following character, said analyzer means providing further coded representations whereby said further coded representations are representative of the applicable concatenation property, g. means for combining said coded representations from said input means with said further coded representations to provide a composite coded representation containing information corresponding to said character under consideration and its applicable concatenation property, and h. output means for receiving said composite coded representations for reproducing said characters with the natural style calligraphy.

2. A system as claimed in claim 1 wherein said concatenation properties are defined by three concatenation variables, one of said concatenation variables representative as to whether a character links or does not link, said other two concatenation variables each representative of the direction of a link and each corresponding to a respective side of said character.

3. A system as claimed in claim 1 wherein said analyzer means comprises:

an availability matrix receiving said second group of signals from said decoder means for providing a third and fourth group of output signals, a status register for receiving said fourth group of output signals from said availability matrix and said first group of signals from said decoder means, said status register providing a plurality of output signals, and an analyzer module for receiving said third group of signals from said availability matrix and said plurality of output signals from said status register, said module providing said further coded representations to said combining means.

4. A method for mechanically reproducing language characters in a cursive form in accordance with the natural style calligraphy of said language, wherein a plurality of $j$ concatenation properties is associated with said natural style calligraphy, a selected combination of said concatenation properties being applicable to each character of said language characters, said selected combination comprising an integral number of said concatenation properties equal in number from $j$ to O where $j$ is an integer; said method comprising;

inserting characters one at a time on an input means to provide coded representations of characters which do concatenate and coded representations of characters which do not concatenate, decoding the coded representations of a character by a decoder which provides outputs which correspond to characters which do concatenate and outputs which correspond to characters which do not concatenate, storing a successive string of coded representations of characters corresponding to a character under consideration, a preceding character and a following character, deriving a further coded representation depending upon the concatenation properties of said character under consideration, said preceding character and said following character, combining said further coded representation with said coded representations from said input means to provide a composite coded representation corresponding to said character under consideration and its applicable concatenation property, and utilizing said composite coded representation to reproduce said characters.

5. A system as recited in claim 1 wherein said input means comprises a keyboard.

6. A system as recited in claim 3 wherein said input means comprises a keyboard.

* * * * *